3,307,814
ADJUSTABLE STAND FOR INSTRUMENTS
Earl M. Bogar, Jr., 3308 Texas Ave.,
Houston, Tex. 77003
Filed May 9, 1966, Ser. No. 548,594
1 Claim. (Cl. 248—188.5)

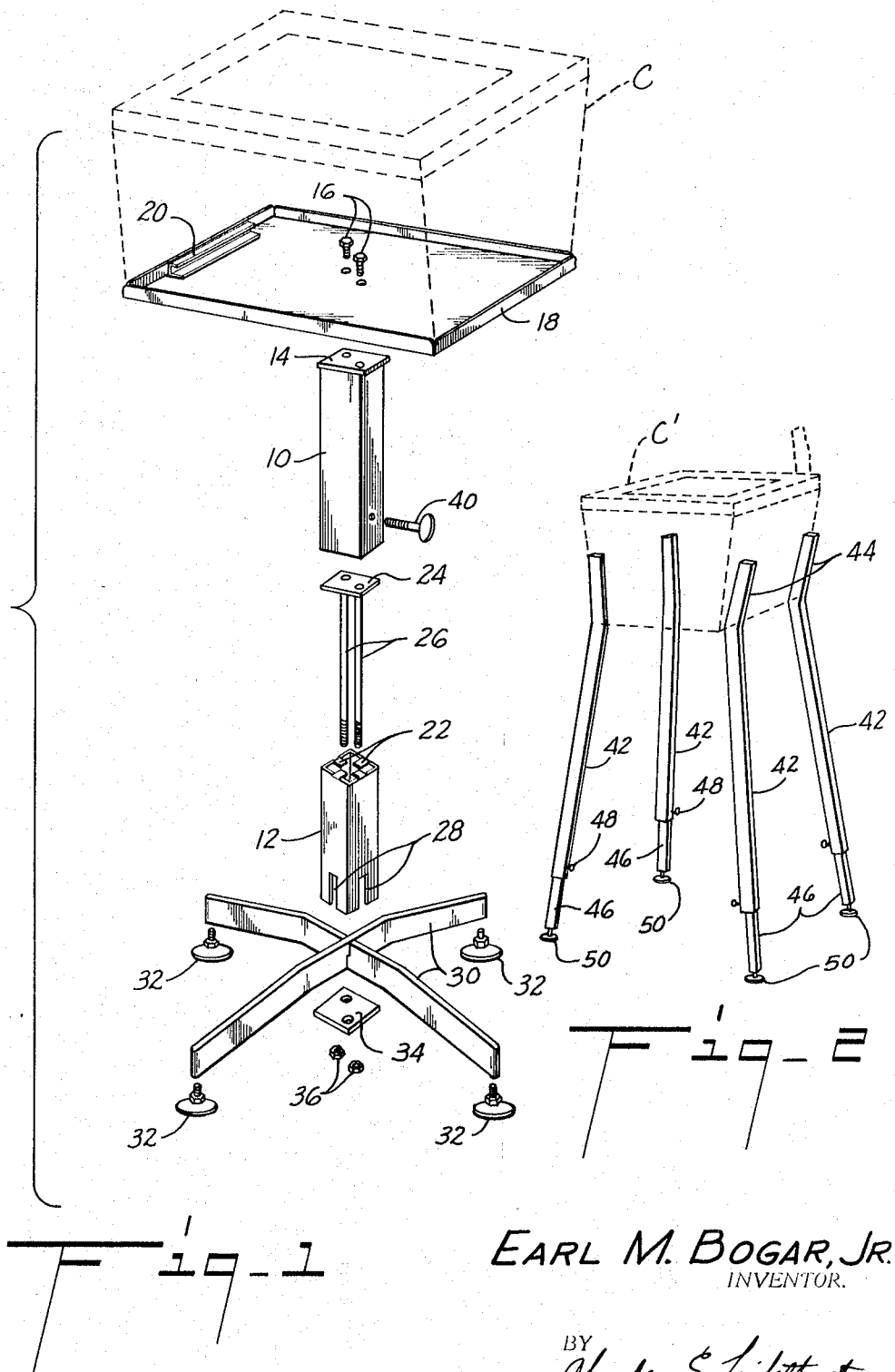

This invention relates to supports or stands for articles such as instruments having casings or housings, and more particularly to a stand or an optical instrument such as a projector, for supporting the same at a predetermined elevation and angular position of adjustment relative to the horizontal.

The invention finds particular application in connection with instruments which are provided with housings or casings having a wall or panel which is recessed, or provided with an externally projecting portion, such as a rib or flange at a location to enable the same to be used as a securing device for releasably holding the casing on a support.

The invention has for an important object the provision of an adjustable stand or support for instruments of the kind mentioned, having means positioned for engagement with the casing to releasably hold the casing on the stand.

A further object of the invention is to provide an adjustable instrument stand embodying means for adjusting the height of the stand to support the instrument at a desired elevation, and also having means for adjusting the stand to support the casing in a predetermined position of angular adjustment, vertically, relative to the horizontal.

A further object of the invention is the provision of an adjustable instrument stand having means positioned for coaction with an instrument casing to automatically hold the casing against displacement when the instrument is placed on the stand, but which does not interfere with the removal of the instrument from the stand upon lifting of the instrument.

A still further object of the invention is to provide an adjustable instrument stand which is of simple design and rugged construction and which may be economically manufactured.

The above and other obvious objects and advantages of the invention will be apparent from the following detailed description, constituting a specification of the same, when considered in conjunction with the annexed drawings, wherein FIGURE 1 is an exploded perspective view of a preferred form of the adjustable stand of the invention; and FIGURE 2 is a perspective view illustrating a modified form of the invention.

Referring now to the drawings in greater detail the invention is disclosed herein in connection with its use as a support for an instrument, such as an optical projector, which it is desired to hold in a predetermined position of elevation and at some predetermined angular adjustment vertically relative to the horizontal, it being understood that the invention is also capable of use for the supporting of other kinds of instruments which it may be desired to maintain in a predetermined position of adjustment during the operation of the instrument. Instruments of this kind are often provided with front panel or wall which is recessed and upon which various control devices are mounted, such recesses forming a lip extending partly across the lower portion of the casing in a convenient location to be used as a means for releasably securing the casing to a support structure. Under other circumstances an instrument casing which is to be used with the present invention may be provided with an externally projecting bead or the like along the lower portion of one wall of the casing in position for engagement with a holding element on the support by which the casing may be releasably held on the support.

The adjustable stand of the invention, as illustrated in FIGURE 1 comprises a telescopingly adjustable upright formed of upper and lower telescopingly arranged tubular elements 10 and 12, which are preferably of rectangular or other polygonal shape in cross-section, the upper element 10 being slidably fitted over the lower element 12.

The upper element 10 has an end plate 14 attached to its upper end, which is perforated to receive screws or bolts 16, extending through perforations in the bottom of a tray-like member 18, positioned on the plate 14 to secure the same thereon.

The tray-like member 18 carries along on marginal side portion thereof an internal, inwardly opening channel element 20, which is positioned for coaction with the lip or bead of an instrument casing C, of the type described above, to releasably hold the casing on the tray. The element 20, may, of course, take the form of an angle or other shaped member having a portion positioned for coaction with the casing to hold the casing on the tray.

The lower element 12 of the upright or standard of the stand is formed at its upper end with inwardly projecting lugs 22, upon which an upper end plate 24 is seated, the plate 24 being of a size not greater than the cross-sectional size of the lower element, so that the plate may be slidably fitted into the lower end of the upper element 10. The plate 24 has elongated bolts 26 attached thereto, which extend downwardly through the lower element 12 and are threaded at their lower ends.

The lower element 12 is also provided with a longitudinally extending end slot 28 in each of its sides, into which slots crossed leg elements 30 extend, such leg elements having at each end and adjustable foot piece 32, threadably connected thereto, whereby the cross leg may may be tilted to a desired angular position relative to the floor.

The lower element 12 is also provided with a lower end plate 34, which closes the slots 28 below the cross legs, and which is perforated to receive the lower ends of the bolts 26 which are extended therethrough and provided with nuts 36 to hold the parts assembled.

In assembling the stand, constructed as described above, the lower tubular element 12 is positioned on the cross legs 30 with the cross legs positioned in the end slots 28, and the bolts 26 are extended through the perforations of the plate 34 and secured thereto by the nuts 36 to clampingly hold the lower elements on the cross legs. The upper element 10, which has been attached to the tray 18, in the manner previously described, is then slidably fitted over the upper end of the lower element 12 and secured thereto by means of a thumb screw 40. By then loosening the thumb screw 40 the upper element 10 may be moved upwardly or downwardly to a desired position of adjustment, whereupon the thumb screw may again be tightened to hold the trap 18 at a desired elevation. By suitably adjusting the threadably attached feet 32 on the cross legs, it will be apparent that the upright may be tilted to any desired angle to hold the tray 18 at a desired angle relative to the horizontal.

With the stand thus assembled, the instrument casing C may be positioned on the tray 18 by merely tilting the casing to allow the lip or bead on the front wall of the casing to be inserted into the holding member 20 and lowering the casing into position on the tray. When thus seated on the tray it will be apparent that the instrument casing will not be dislodged during adjustment of the stand or its movement from one location to another in an upright position, but the casing may be readily removed from the stand by merely picking up the casing and allowing the casing to tilt relative to the holding member 20, whereupon the lip or bead will be moved out of the holding member to release the casing.

A modified form of the invention is illustrated in FIGURE 2, wherein the instrument casing C' has attached to opposite sides thereof upper tubular leg elements 42, which are preferably of rectangular or other polygonal shape in cross-section, and which are formed at their upper ends with outwardly opening channel portions 44, within which suitable means, such as bolts or screws may be extended through perforations to secure the casing to the legs. In this form of the invention the legs are provided with lower, elongated elements 46, telescopingly received in the upper elements 42, and which are also of rectangular or polygonal shape in cross-section to prevent rotation of the lower elements in the upper elements. Suitable means, such as thumb screws 48 are carried by the upper elements 42 which may be tightened into engagement with the lower elements 46, to hold the lower elements at any desired position of adjustment. Each of the lower elements 46 may be provided with a suitable foot piece 50, if desired.

In making use of the stand as illustrated in FIGURE 2 the lower leg elements 46 may be slidably adjusted relative to the upper leg elements to move the casing C' to any desired position of elevation, and by suitably adjusting the lower leg elements at one side of the casing the casing may be tilted to any desired angular position relative to the horizontal.

It will thus be seen that the invention provides an adjustable instrument stand by which instruments of various kinds may be held at a desired elevation and at a desired angular position of adjustment relative to the horizontal, and which also provides a means for releasably connecting the casing to the stand to hold the casing against accidental displacement, while permitting the same to be removed from the stand by merely lifting the casing off.

The invention is disclosed herein in connection with certain specific embodiments of the same which are intended by way of illustration only, it being evident that various changes can be made in the structure of the stand, within the spirit of the invention and the scope of the appended claim.

Having thus clearly shown and described the invention, what is claimed as new and desired to secure by Letters Patent, is:

A stand for an instrument of the type having a box-like casing comprising,
(A) crossed leg elements,
(B) longitudinally extensible upright means including
    (a) upper and lower, telescopingly arranged tubular parts of polygonal shape in cross-section, slidable longitudinally relative to each other, said lower part having end slots at its lower end into which said leg elements are fitted,
    (b) means for securing the lower part to said leg elements comprising
        (1) an upper end plate on said lower part,
        (2) fastening means connected to said upper end plate and extending downwardly through said lower part, and
        (3) means positioned for coaction with said leg elements and said fastening means to hold said leg elements in said slots,
(C) a tray-like member supported on the upper end of said upright means, and
(D) means on said member positioned for engagement with said casing when the casing is positioned on the member to hold a casing against vertical movement relative to the member.

References Cited by the Examiner
UNITED STATES PATENTS

| | | | |
|---|---|---|---|
| 775,006 | 11/1904 | Groll et al. | 108—150 |
| 962,844 | 6/1910 | Kaufmann | 248—178 X |
| 1,774,237 | 8/1930 | Rand | 312—107 |
| 1,783,661 | 12/1930 | Makoski et al. | 108—147 |
| 2,430,826 | 11/1947 | Rodman et al. | 248—11 |
| 2,482,979 | 9/1949 | Isakson | 248—188.7 |
| 2,579,348 | 12/1951 | Taylor | 248—178 |
| 2,831,739 | 4/1958 | Fayckholm | 248—188.5 |
| 2,914,954 | 12/1959 | Best | 248—124 X |

CLAUDE A. LE ROY, *Primary Examiner*.